United States Patent
Jeong et al.

(10) Patent No.: US 9,730,039 B2
(45) Date of Patent: Aug. 8, 2017

(54) METHOD AND APPARATUS FOR TRANSCEIVING A WARNING MESSAGE IN A WIRELESS COMMUNICATION SYSTEM

(71) Applicant: Samsung Electronics Co., Ltd., Suwon-si, Gyeonggi-do (KR)

(72) Inventors: Kyeong-In Jeong, Suwon-si (KR); Yang-Ick Joo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

(21) Appl. No.: 14/366,159

(22) PCT Filed: Dec. 18, 2012

(86) PCT No.: PCT/KR2012/011109
§ 371 (c)(1),
(2) Date: Sep. 9, 2014

(87) PCT Pub. No.: WO2013/094985
PCT Pub. Date: Jun. 27, 2013

(65) Prior Publication Data
US 2014/0378085 A1 Dec. 25, 2014

(30) Foreign Application Priority Data
Dec. 20, 2011 (KR) ........................ 10-2011-0138078

(51) Int. Cl.
*H04W 4/22* (2009.01)
*H04W 68/02* (2009.01)
*H04W 4/12* (2009.01)
*H04W 4/06* (2009.01)

(52) U.S. Cl.
CPC ............... *H04W 4/22* (2013.01); *H04W 4/12* (2013.01); *H04W 68/02* (2013.01); *H04W 4/06* (2013.01)

(58) Field of Classification Search
CPC ................................. H04W 4/22; H04W 68/02
See application file for complete search history.

(56) References Cited

U.S. PATENT DOCUMENTS

| 8,917,659 | B2* | 12/2014 | Lee | ........................ | H04W 48/12 370/328 |
| 2003/0194992 | A1* | 10/2003 | Kim | ..................... | H04W 72/005 455/414.1 |
| 2006/0281444 | A1* | 12/2006 | Jung | ..................... | H04H 20/16 455/414.4 |

(Continued)

OTHER PUBLICATIONS

3GPP TS22.168 V8.1.0; 3rd Generation Partnership Project; Technical Specification Group Services and System Aspects; Earthquake and Tsunami Warning System (ETWS) requirements; Stage 1; (Release 8); Jun. 11, 2008.

(Continued)

*Primary Examiner* — Christopher M Brandt
(74) *Attorney, Agent, or Firm* — Jefferson IP Law, LLP

(57) ABSTRACT

A method and an apparatus for transmitting/receiving a warning message in a wireless communication system are provided. In a method for transmitting a warning message at a base station, a warning message is generated. A paging message including information for the warning message scheduled to be transmitted is broadcasted. A system information block message including the generated warning message is broadcasted.

20 Claims, 16 Drawing Sheets

(56) References Cited

U.S. PATENT DOCUMENTS

| | | | |
|---|---|---|---|
| 2007/0060139 A1* | 3/2007 | Kim | H04L 1/1841 |
| | | | 455/445 |
| 2008/0070522 A1* | 3/2008 | Marriott | H04H 20/38 |
| | | | 455/150.1 |
| 2009/0239498 A1* | 9/2009 | Lee et al. | 455/404.1 |
| 2010/0075625 A1* | 3/2010 | Wu | 455/404.1 |
| 2010/0099439 A1 | 4/2010 | Aghili et al. | |
| 2010/0173603 A1* | 7/2010 | Kwak et al. | 455/404.1 |
| 2010/0173604 A1* | 7/2010 | Hofmann | G08B 27/008 |
| | | | 455/404.1 |
| 2010/0183031 A1* | 7/2010 | Dalsgaard et al. | 370/474 |
| 2010/0216421 A1* | 8/2010 | Hsu | 455/404.1 |
| 2011/0103308 A1* | 5/2011 | Lee | H04W 48/12 |
| | | | 370/328 |
| 2011/0128904 A1* | 6/2011 | Gou et al. | 370/312 |
| 2011/0151828 A1 | 6/2011 | Gou et al. | |
| 2011/0237218 A1* | 9/2011 | Aoyama | H04H 20/59 |
| | | | 455/404.1 |

OTHER PUBLICATIONS

3GPP TS22.268 V11.2.0; 3rd Generation Partnership Project; Technical Specification Group Services and System Aspects; Public Warning System (PWS) requirements (Release 11); Oct. 3, 2011.

* cited by examiner

```
<ETWS>
Paging ::=           SEQUENCE {
    etwsInfoList                EtwsInfoList        OPTIONAL,       --Need ON
    nonCriticalExtension        Paging-v890-IEs     OPTIONAL
}

EtwsInfoList ::=     SEQUENCE (SIZE (1..maxEtwsInfo)) OF EtwsInfo

EtwsInfo ::=   1101  SEQUENCE {
    messageIdentifier           BIT STRING,
    ...
}
```

---

```
<CMAS>
                     SEQUENCE {
                        OCTET STRING
Paging-v890-IEs ::=
    lateNonCriticalExtension    Paging-v920-IEs
    nonCriticalExtension                            OPTIONAL,       --Need OP
}
Paging-v920-IEs ::=  SEQUENCE {
    CmasInfoList                CmasInfoList        OPTIONAL,       --Need ON
    nonCriticalExtension        SEQUENCE {}         OPTIONAL        --Need OP
}

CmasInfoList ::=     SEQUENCE (SIZE (1..maxCmasInfo)) OF CmasInfo

CmasInfo ::=   1101  SEQUENCE {
    messageIdentifier           BIT STRING,
    ...
}
```

FIG.11

```
SystemInfomationBlockType## ::=   SEQUENCE {
    messageIdentifier              BIT STRING,
    serialNumber                   BIT STRING,
    serialNumberType               ENUMERATED   {Normal, Last},
    ......
}
```

FIG.12A

```
SystemInformationBlockType## ::=   SEQUENCE {
    messageIdentifier              BIT STRING,
    serialNumber                   BIT STRING,
    serialNumberType               ENUMERATED  {Normal, Last, First},
                                                 ~1213
    ~1211
    .......
}
```

FIG.12B

```
<ETWS>
Paging ::=          SEQUENCE {
    ...,
    etwsInfoList            EtwsInfoList        OPTIONAL,
    nonCriticalExtension    Paging-v890-IEs     OPTIONAL    ---Need ON
}
EtwsInfoList ::=    SEQUENCE (SIZE (1..maxEtwsInfo)) OF EtwsInfo
EtwsInfo ::=    SEQUENCE {        1301
    messageIdentifier       BIT STRING,      }
    lastSerialNumber        BIT STRING,      } 1303
    ...
}
```

```
<CMAS>
Paging-v890-IEs ::= SEQUENCE {
    lateNonCriticalExtension    OCTET STRING        OPTIONAL,
    nonCriticalExtension        Paging-v920-IEs     OPTIONAL    ---Need OP
}
Paging-v920-IEs ::= SEQUENCE {
    CmasInfoList            CmasInfoList        OPTIONAL,   ---Need ON
    nonCriticalExtension    SEQUENCE {}         OPTIONAL    ---Need OP
}
CmasInfoList ::=    SEQUENCE (SIZE (1..maxCmasInfo)) OF CmasInfo
CmasInfo ::=    SEQUENCE {        1301
    messageIdentifier       BIT STRING,      }
    lastSerialNumber        BIT STRING,      } 1303
    ...
}
```

FIG.13A

```
<ETWS>
Paging  ::=             SEQUENCE {
    ...,
    etwsInfoList            EtwsInfoList            OPTIONAL,
    nonCriticalExtension    Paging-v890-IEs         OPTIONAL           -- Need ON
}

EtwsInfoList  ::=       SEQUENCE (SIZE (1..maxEtwsInfo)) OF EtwsInfo

EtwsInfo  ::=           SEQUENCE {        ~1311
    messageIdentifier       BIT STRING,
    lastSerialNumber        BIT STRING,    ~1313
    firstSerialNumber       BIT STRING,
    ...                                    1315
}
```

```
<CMAS>
Paging-v890-IEs  ::=    SEQUENCE {
    lateNonCriticalExtension    OCTET STRING        OPTIONAL,
    nonCriticalExtension        Paging-v920-IEs     OPTIONAL           -- Need OP
}

Paging-v920-IEs  ::=    SEQUENCE {
    CmasInfoList                CmasInfoList        OPTIONAL,          -- Need ON
    nonCriticalExtension        SEQUENCE {}         OPTIONAL           -- Need OP
}

CmasInfoList  ::=       SEQUENCE (SIZE (1..maxCmasInfo)) OF CmasInfo

CmasInfo  ::=           SEQUENCE {        ~1311
    messageIdentifier       BIT STRING,
    lastSerialNumber        BIT STRING,    ~1313
    firstSerialNumber       BIT STRING,
    ...                                    1315
}
```

FIG.13B

```
Paging ::=          SEQUENCE {
    ...,
    etws-Indication               ENUMERATED {true}      OPTIONAL,    --Need ON
    etwsInfoValueTag   ~1401      INTEGER,
    nonCriticalExtension          Paging-v890-IEs        OPTIONAL
}

<ETWS>

Paging-v890-IEs ::=   SEQUENCE {
    lateNonCriticalExtension      OCTET STRING           OPTIONAL,    --Need OP
    nonCriticalExtension          Paging-v920-IEs        OPTIONAL
}

Paging-v920-IEs ::=   SEQUENCE {
    cmas-Indication-r9            ENUMERATED {true}      OPTIONAL,    --Need ON
    cmasInfoValueTag   ~1401      INTEGER,
    nonCriticalExtension          Paging-v890-IEs        OPTIONAL     --Need OP
}

<CMAS>
```

FIG.14

METHOD AND APPARATUS FOR TRANSCEIVING A WARNING MESSAGE IN A WIRELESS COMMUNICATION SYSTEM

BACKGROUND OF THE INVENTION

1. Field of the Invention

The present invention relates to a method and an apparatus for transmitting/receiving a warning message for an emergency and disaster circumstance in a wireless communication system.

2. Description of the Related Art

Recently, an Alert or Warning message transmission service for an emergency and disaster circumstance, etc. is introduced to a cellular wireless communication system. Particularly, a 3GPP Long Term Evolution (LTE) standard broadcasts a Commercial Mobile Alert Service (CMAS) message and an Earthquake and Tsunami Warning System (ETWS) message which are alert and warning messages for an emergency and disaster circumstance via a System Information Block (SIB) message.

Particularly, in the LTE system, a base station notifies a warning message is to be transmitted via an SIB in advance by indicating ETWS indication information or CMAS indication information inside a paging message, and then broadcasts the warning message via the SIB. At this point, the warning message includes a message Identifier (ID), a serial number, and a warning message segment. Then, the terminal determines ETWS indication information or CMAS indication information has been set from the paging message, and then receives a system information block type 1 to determine scheduling information where an ETWS message or a CMAS message is to be transmitted, and receives a SIB message including the ETWS message or the CMAS message depending on the scheduling information. At this point, the terminal provides a warning message to a user by collecting and processing segments of a warning message having the same message ID and having different serial numbers.

However, in a warning message transmission system according to the conventional art, since there is no basis on which a terminal may determine reception completion of a warning message, the terminal cannot recognize message reception even in the case where the terminal has received all of a warning message of a specific ID broadcasted by a base station. Accordingly, the terminal continues to receive the SIB in order to receive a warning message of a different serial number having the specific ID or receive a warning message having a different message ID while warning message indication information has been set to "True" inside the paging message, that is, until a paging message where the warning message indication information has been set to "False" is received. Therefore, in the warning message transmission system according to the conventional art, a terminal has a problem of repeatedly receiving a warning message having the same serial number with respect to a specific ID, and so power consumption is wasted.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for transmitting/receiving a warning message for an emergency and disaster circumstance in a wireless communication system.

Another aspect of the present invention is to provide a method and an apparatus for allowing a base station to indicate range information for a warning message using at least one of a paging message and a system information block message in a wireless communication system.

Still another aspect of the present invention is to provide a method and an apparatus for allowing a terminal to determine range information for a warning message from at least one of a paging message and a system information block message and determine reception completion of a relevant warning message in a wireless communication system.

Yet another aspect of the present invention is to provide a method and an apparatus for allowing a base station to indicate at least one of identify information of a warning message scheduled to be transmitted and whether an updated warning message exists via a paging message in a wireless communication system.

Still yet another aspect of the present invention is to provide a method and an apparatus for allowing a terminal to determine identify information of a warning message scheduled to be transmitted and whether an updated warning message exists from a paging message and receive a relevant warning message in a wireless communication system.

In accordance with an aspect of the present invention, a method for transmitting a warning message at a base station of a wireless communication system is provided. The method includes generating a warning message, broadcasting a paging message including information for the warning message scheduled to be transmitted, and broadcasting a system information block message including the generated warning message, wherein information for a reception range of the generated warning message is indicated using at least one of the paging message and the warning message.

In accordance with another aspect of the present invention, a method for receiving a warning message at a terminal of a wireless communication system is provided. The method includes receiving a paging message including information for a warning message scheduled to be transmitted, receiving a system information block message including a warning message, and obtaining information for a reception range of the warning message from at least one of the paging message and the warning message to determine reception completion of the warning message.

In accordance with still another aspect of the present invention, an apparatus for transmitting a warning message at a base station of a wireless communication system is provided. The apparatus includes a transmitter for broadcasting a paging message including information for a warning message scheduled to be transmitted, and broadcasting a system information block message including a generated warning message, and a warning message transmission controller for generating a warning message, and indicating information for a reception range of the generated warning message in at least one of the paging message and the warning message.

In accordance with yet still another aspect of the present invention, an apparatus for receiving a warning message at a terminal of a wireless communication system is provided. The apparatus includes a receiver for receiving a paging message including information for a warning message scheduled to be transmitted, and receiving a system information block message including a warning message, and a warning message reception controller for obtaining information for a reception range of the warning message from at least one of the paging message and the warning message to determine reception completion of the warning message.

According to the present invention, a base station of a wireless communication system provides information as to whether a warning message that should be received by a terminal exists and range information of a relevant warning message when transmitting the warning message, so that the base station may determine points at which the terminal starts and ends relevant warning message reception to prevent the terminal from repeatedly receiving a system information block including the same warning message and minimize unnecessary reception power consumption.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 11 is a view illustrating construction of a paging message including warning message identify information in a wireless communication system according to an embodiment of the present invention;

FIGS. 12A and 12B are views illustrating construction of a system information block message in a wireless communication system according to an embodiment of the present invention;

FIGS. 13A and 13B are views illustrating construction of a paging message indicating identify information and a range of a warning message in a wireless communication system according to an embodiment of the present invention; and FIG. 14 is a view illustrating construction of a paging message indicating whether a warning message is updated in a wireless communication system according to an embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Also, descriptions of well-known functions and constructions are omitted for clarity and conciseness. The terms and words used in the following description and claims are not limited to the bibliographical meanings, but, are merely used by the inventor to enable a clear and consistent understanding of the invention.

Hereinafter, the present invention describes in detail a method and an apparatus for transmitting and receiving a warning message for emergency and disaster circumstances in a wireless communication system. The present invention describes a Long Term Evolution (LTE) system as an example for convenience in description, and is equally applicable to other mobile communication systems such as Wideband Code Division Multiple Access (WCDMA), International Mobile Telecommunication (IMT) 2000, etc.

Figure 1:
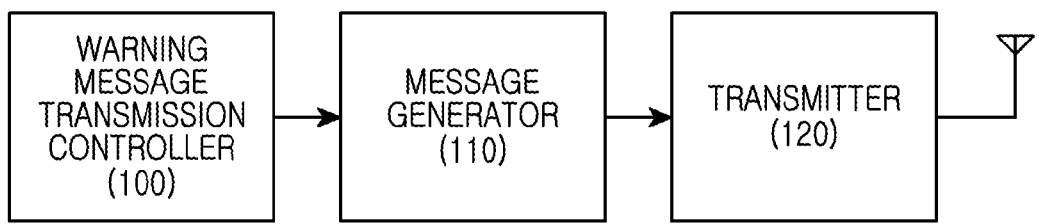
FIG. 1 is a block diagram illustrating a base station in a wireless communication system according to the present invention.

FIG. 1 is a block diagram illustrating a base station in a wireless communication system according to the present invention. Referring to FIG. 1, the base station includes a warning message transmission controller 100, a message generator 110, and a transmitter 120.

The warning message transmission controller 100 controls and processes a function for broadcasting a warning message when an emergency and disaster circumstance occur. Particularly, the warning message transmission controller 100 controls and processes a function for representing whether a warning message that should be received by a terminal exists via a paging message broadcasted every period set in advance, and indicating a range of the warning message using at least one of the paging message and a system information block message. Here, the warning message may include a message ID, a serial number, and a warning message segment. Accordingly, the warning message transmission controller 100 may generate a plurality of warning messages for the emergency and disaster circumstance, and at this point, set the same ID to the plurality of warning messages for the same circumstance, and set different serial numbers to respective warning messages. For example, in the case where an earthquake occurs inside a cell region of a specific base station, the warning message transmission controller 100 may generate a plurality of warning messages for the earthquake generation and evacuation, set the same ID to all of the generated warning messages, and give different serial numbers to respective warning messages.

Here, the warning message transmission controller 100 may be operated in various methods depending on design schemes. For example, the warning message transmission controller 100 may control and process a function for generating a paging message and a system information block message according to one of four methods described in FIGS. 3, 5, 7, 9. The four methods are briefly described below.

First, the warning message transmission controller 100 controls and processes a function for indicating identify information of a warning message scheduled to be transmitted in the paging message, and indicating serial number type information indicating whether a relevant message is a last warning message in the system information block message.

Second, the warning message transmission controller 100 controls and processes a function for indicating identify information of a warning message scheduled to be transmitted and a last serial number of a relevant warning message in the paging message.

Third, the warning message transmission controller 100 controls and processes a function for indicating information indicating a warning message is updated in the paging message, and indicating serial number type information indicating whether a relevant message is a last warning message in the system information block message.

Fourth, the warning message transmission controller 100 controls and processes a function for setting information indicating a warning message is updated and a last serial number of a relevant warning message in the paging message.

The message generator 110 generates a system information block message including a paging message and a warning message under control of the warning message transmission controller 100.

The transmitter 120 controls and processes a function for broadcasting a message generated from the message generator 110 to terminals inside a cell.

Figure 2:
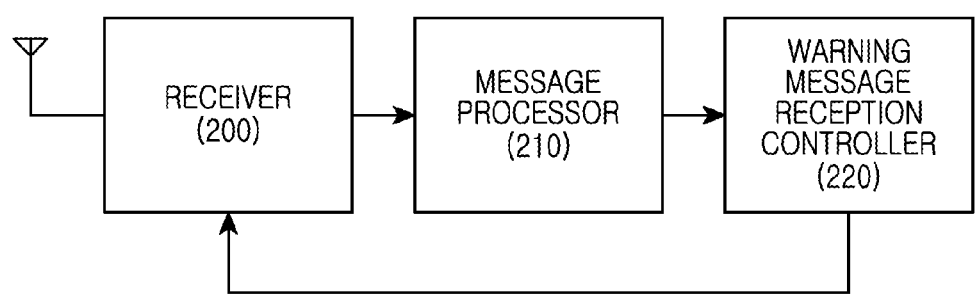
FIG. 2 is a block diagram illustrating a terminal in a wireless communication system according to the present invention.

FIG. 2 is a block diagram illustrating a terminal in a wireless communication system according to the present invention. Referring to FIG. 2, the terminal includes a receiver 200, a message processor 210, and a warning message reception controller 220.

The receiver 200 receives a message received from a base station via a wireless channel and provides the same to the message processor 210. Particularly, the receiver 200 receives a paging message and a system information block message under control of the warning message reception controller 220. Also, the receiver 200 starts to receive a system information block message in order to receive a warning message according to a request of the warning message reception controller 220, and stops receiving the system information block message according to a request of the warning message reception controller 220.

The message processor 210 processes a message provided from the receiver 200 to provide the same to the warning message reception controller 220. That is, the message processor 210 analyzes a paging message provided from the receiver 200 to extract information such as warning message indication information, identify information of a warning message scheduled to be transmitted, whether a warning message is updated, a last serial number of a warning message, etc., and provides the extracted information to the warning message reception controller 220. Also, the message processor 210 extracts serial number type information of a warning message from a system information block message provided from the receiver 200, and provides the extracted serial number type information to the warning message reception controller 220.

When a paging message where warning message indication information has been set is received, the warning message reception controller 220 controls and processes a function for receiving a relevant warning message. That is, the warning message reception controller 220 obtains whether a warning message that should be received by the terminal exists and information regarding a range of a warning message that should be received by the terminal from the paging message and the system information block message, and controls the receiver 200 to perform a function for receiving a relevant warning message. At this point, the warning message reception controller 220 may be operated in various methods depending on design schemes. For example, the warning message reception controller 220 obtains whether a warning message that should be received by the terminal exists and information regarding a range of a warning message that should be received by the terminal from the paging message and the system information block message according to one of four methods described in FIGS. 4, 6, 8, 10, and then receives a warning message, and determines reception completion of a relevant warning message. The four methods are briefly described below.

First, the warning message reception controller 220 obtains identify information of a warning message scheduled to be transmitted from the paging message, and obtains serial number type information indicating whether a relevant message is a last warning message from the system information block message to determine reception completion of a relevant warning message.

Second, the warning message reception controller 220 obtains identify information of a warning message scheduled to be transmitted and a last serial number of a relevant warning message from the paging message to determine reception completion of a relevant warning message.

Third, the warning message reception controller 220 obtains information indicating a warning message is updated from the paging message, and obtains serial number type information indicating whether a relevant message is a last warning message from a system information block message to determine reception completion of a relevant warning message.

Fourth, the warning message reception controller 220 obtains information indicating a warning message is updated and a last serial number of a relevant warning message from the paging message to determine reception completion of a relevant warning message.

Hereinafter, the four methods for transmitting/receiving a warning message are described in detail with reference to FIGS. 3 to 10.

Figure 3:
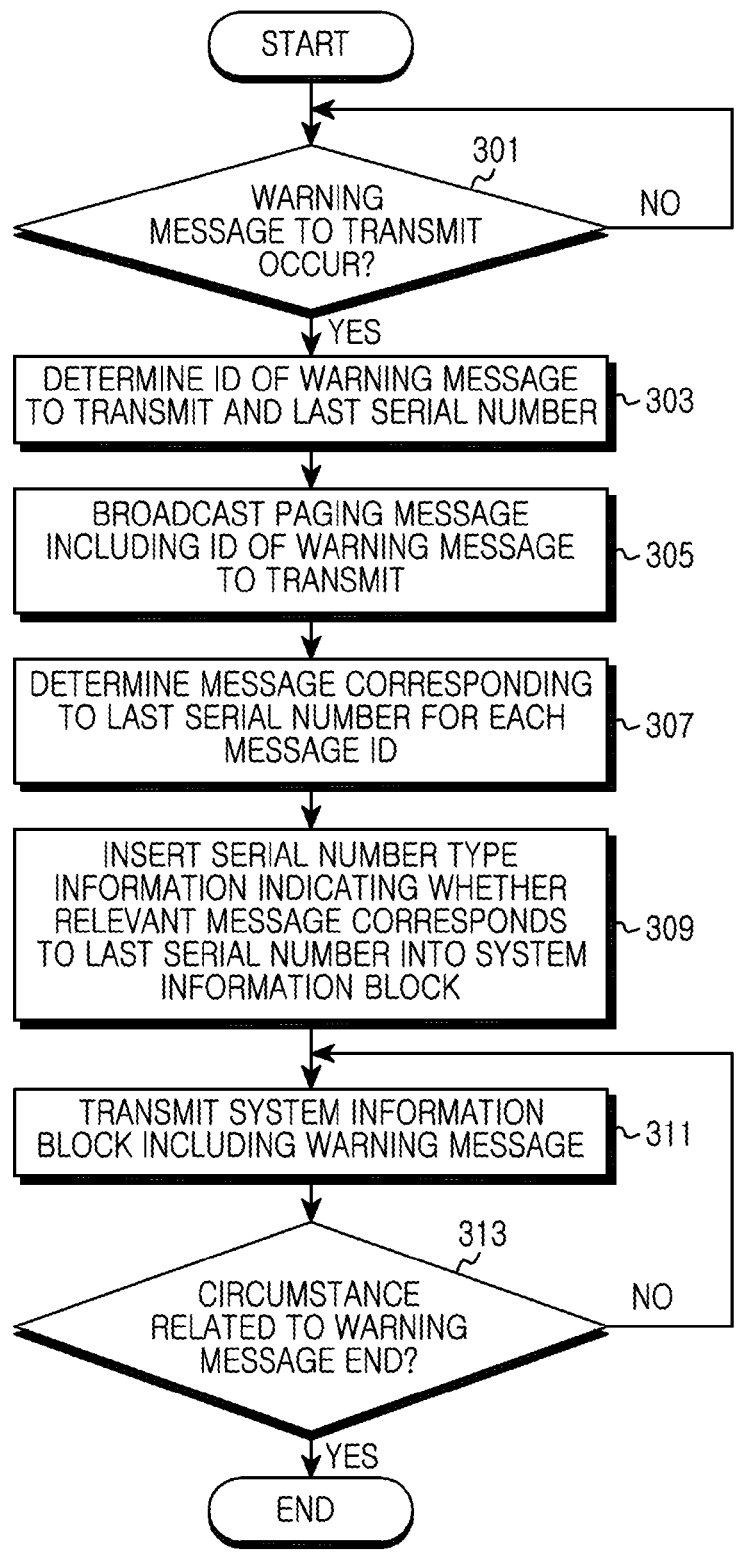
FIG. 3 is a flowchart illustrating a warning message broadcast procedure of a base station in a wireless communication system according to an embodiment of the present invention.
Figure 4:
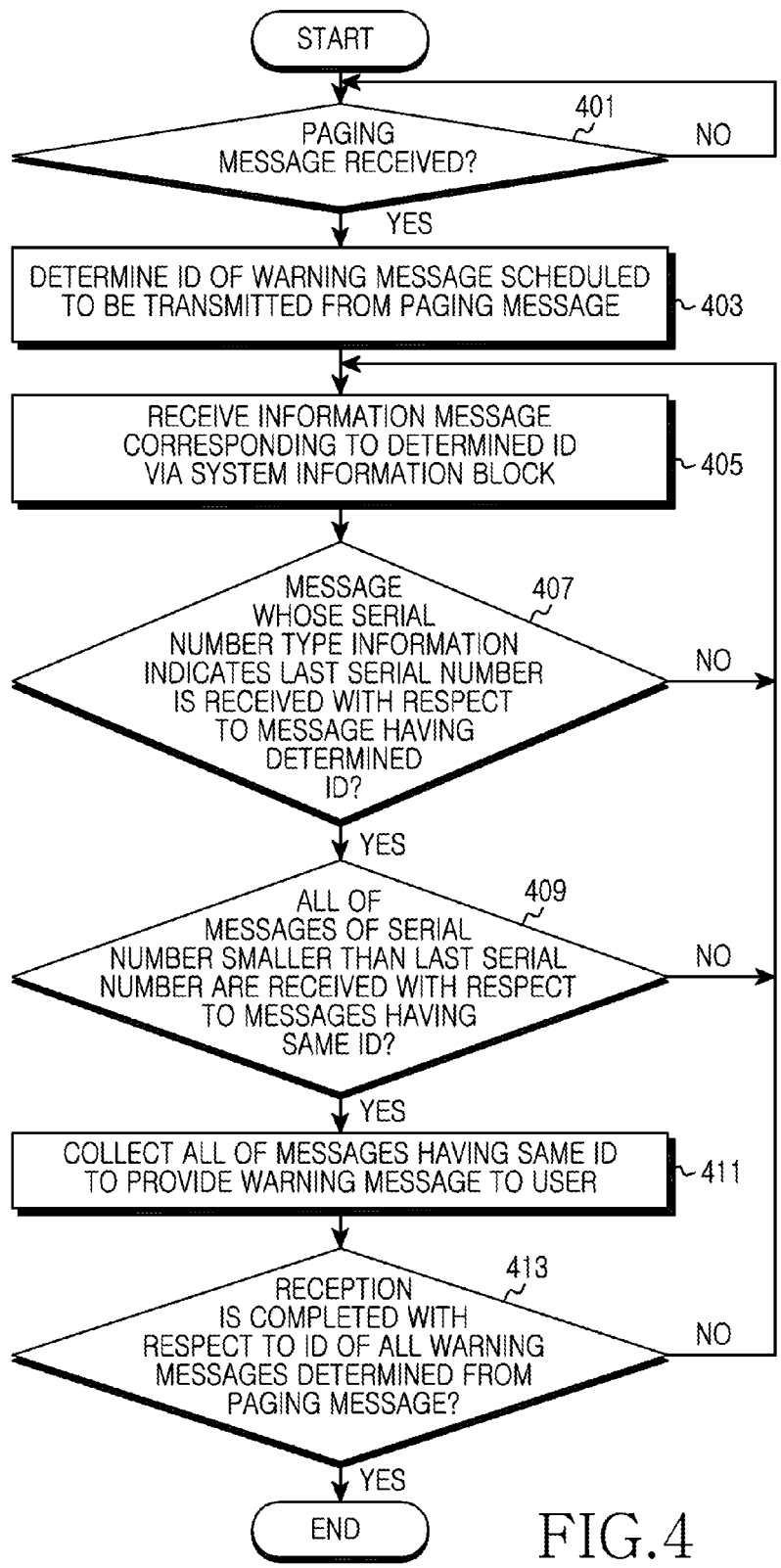
FIG. 4 is a flowchart illustrating a warning message receiving procedure of a terminal in a wireless communication system according to an embodiment of the present invention.

FIGS. 3 and 4 illustrate an operations of a base station and a terminal for a method representing identify information of a warning message scheduled to be transmitted in a paging message, and representing serial number type information in a system information block message in order to transmit/receive a warning message.

FIG. 3 is a flowchart illustrating a warning message broadcast procedure of a base station in a wireless communication system according to an embodiment of the present invention.

Referring to FIG. 3, the base station determines whether a warning message to transmit occurs due to an emergency and disaster circumstance in step 301.

When the warning message to transmit occurs, the base station proceeds to step 303 to determine an ID of the warning message to transmit and a last serial number. Here, the base station may generate a plurality of warning messages for the emergency and disaster circumstance, and at this point, set the same ID to the plurality of warning messages for the same circumstance, and set different serial numbers to the respective warning messages. The base station may determine serial numbers of warning messages having the same ID to determine a largest serial number as the last serial number.

After that, the base station proceeds to step 305 to broadcast a paging message including an ID of a warning message to transmit. For example, as illustrated in FIG. 11, the base station may incorporate an ID 1101 of a warning message into a paging message indicating transmission of an ETWS message and a paging message indicating transmission of a CMAS message, and transmit the same. Of course, the paging message should include warning message indication information indicating transmission of a warning message.

After that, the base station determines a warning message corresponding to a last serial number for each of warning messages having the same ID in step 307, and then proceeds to step 309 to insert serial number type information indicating whether a relevant message corresponds to a last serial number with respect to respective warning messages included in a system information block. For example, as illustrated in FIG. 12A, the base station may add a field indicating a serial number type 1201 inside a system information block to set serial number type information of a warning message corresponding to a last serial number to "Last", and set serial number type information of the other warning messages to "Normal". Here, the base station inserts serial number type information into each warning message inside the system information block to allow a terminal to determine a reception completion point of a relevant warning message. At this point, to allow the terminal to determine the reception completion point of the relevant warning message, as illustrated in FIG. 12B, the base station may set serial number type information of a warning message corresponding to a last serial number to "Last", set serial number type information of a warning message corresponding to a first serial number to "First", and set serial number type information of the other warning messages to "Normal".

After that, the base station transmits the system information block message in step 311, and proceeds to step 313 to determine whether a circumstance related to the warning message has ended. When the circumstance related to the warning message has not ended, the base station returns to step 311 to re-perform subsequent steps. In contrast, when the circumstances related to all the warning messages have ended, the base station ends the algorithm according to the present invention.

FIG. 4 is a flowchart illustrating a warning message receiving procedure of a terminal in a wireless communication system according to an embodiment of the present invention.

Referring to FIG. 4, the terminal determines whether a paging message is received in step 401. When the paging message is received, the terminal determines an ID of a warning message scheduled to be transmitted from the received paging message in step 403. Of course, at this point, the terminal may determine the base station transmits a warning message via a system information block message before the base station transmits the next paging message by determining warning message indication information from the received paging message, and accordingly determine the terminal should receive a warning message having the determined ID.

After that, the terminal receives warning messages corresponding to the determined ID via a system information block in step 405. Here, the terminal may receive warning messages corresponding to the determined ID via a relevant system information block by determining scheduling information where the warning message is to be transmitted via the system information block type 1.

After that, the terminal determines whether a message whose serial number type information indicates a last serial number is received with respect to a message having the determined ID in step 407. That is, the terminal determines whether a warning message whose serial number type information has been set to "Last" inside the system information block has been received. When the warning message whose serial number type information indicates a last serial number has not been received, the terminal returns to step 405 to continue to receive a warning message having a relevant ID via the system information block.

In contrast, when a warning message whose serial number type information indicates a last serial number is received, the terminal proceeds to step 409 to determine whether all of messages whose serial number is smaller than the last serial number have been received. At this point, when a warning message of the same ID received before the paging message of step 401 is received exists, the terminal may determine whether all of warning messages from a serial number greater than a serial number of the previously received warning message by 1 to a serial number smaller than the last serial number have been received. For example, with respect to a warning message whose message ID is A, when it is determined that the terminal has received warning messages whose message ID is A in advance via a paging message received at a previous point, serial numbers of the warning messages received in advance are 1, 2, 3, 4, and a last serial number is 9 as a result of receiving warning messages whose message ID is A via a paging message received at a current point, the terminal determines whether all of warning messages whose message ID is A and whose serial numbers are 5, 6, 7, 8 are received. For another example, when a warning message whose serial number type information has been set to "First" is received via a system information block, the base station may determine a serial number of the warning message set to "First" as a first serial number, and determine whether all of warning messages from the first serial number to the last serial number have been received.

In the case where all of messages whose serial number is smaller than the last serial number have not been received, the terminal returns to step 405 to re-perform subsequent steps. In the case where all of messages whose serial number is smaller than the last serial number have been received, the terminal determines reception of a warning message for a relevant ID has been completed, stops an operation for receiving a warning message for the relevant ID, and then proceeds to step 411 to collect and process all of messages whose serial numbers are different from each other, having the same ID, thereby providing content of the warning message to a user.

After that, the terminal proceeds to step 413 to determine whether reception has been completed with respect to an ID of all warning messages determined from the paging message received in step 401. When reception has not been completed with respect to an ID of all the warning messages, the terminal returns to step 405 to re-perform subsequent steps. In contrast, when reception has been completed with respect to an ID of all the warning messages, the terminal ends the algorithm according to the present invention.

Figure 5:
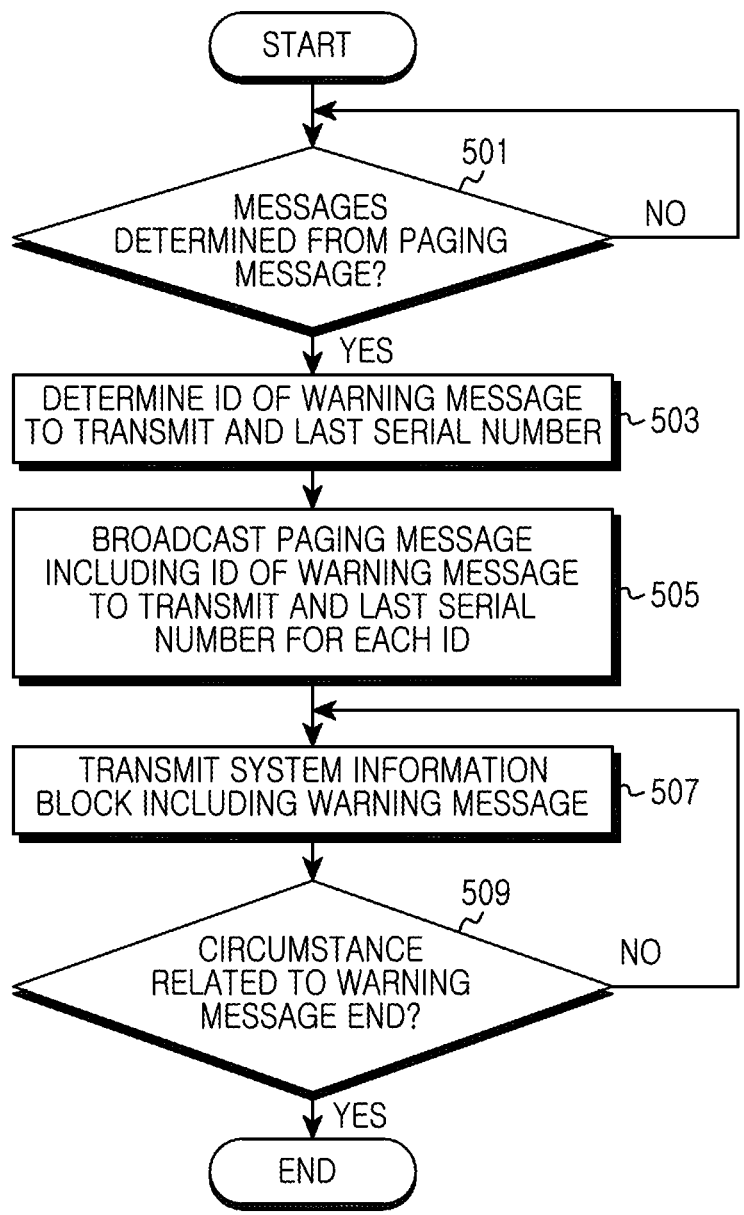
FIG. 5 is a flowchart illustrating a warning message broadcast procedure of a base station in a wireless communication system according to another embodiment of the present invention.
Figure 6:
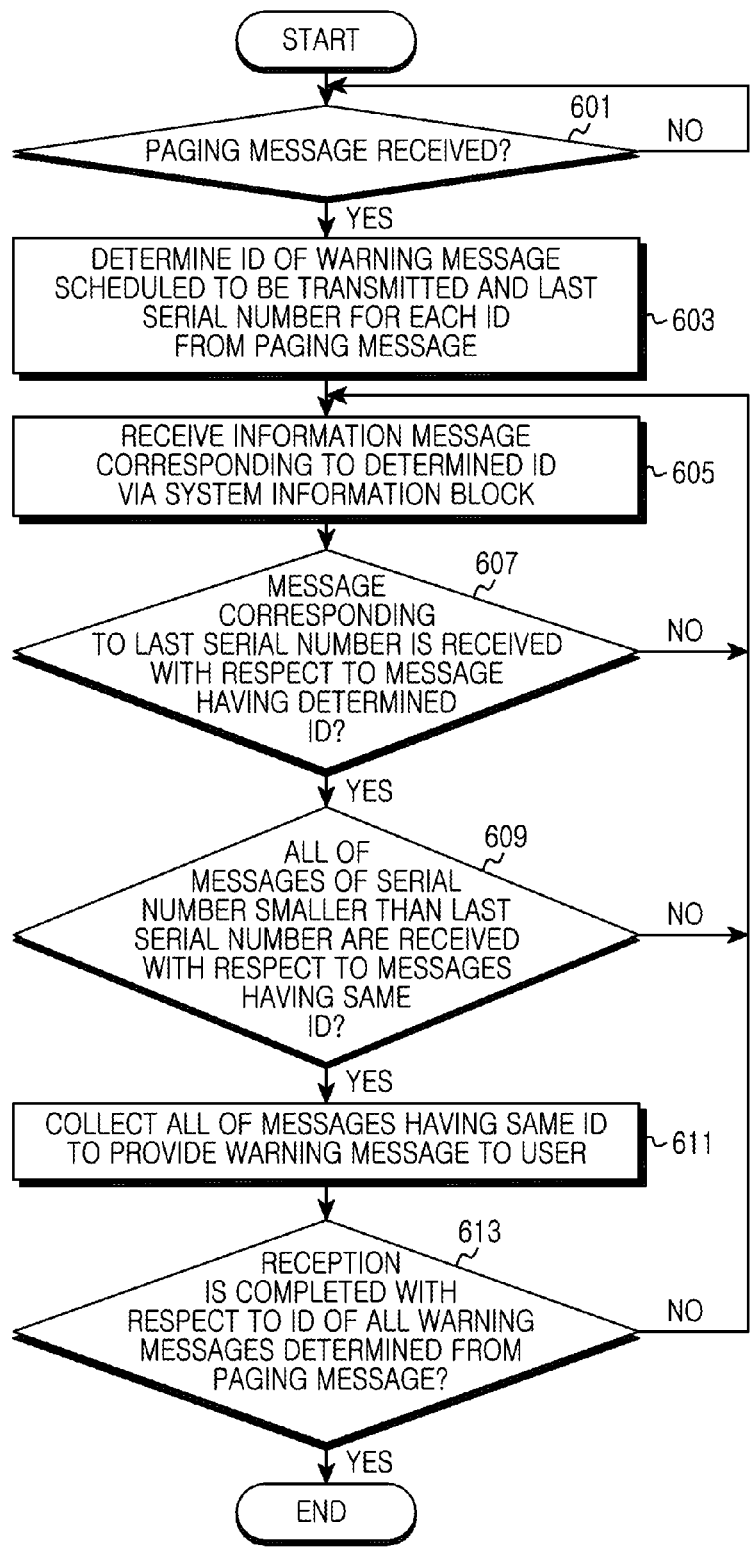
FIG. 6 is a flowchart illustrating a warning message receiving procedure of a terminal in a wireless communication system according to another embodiment of the present invention.

Next, FIGS. 5 and 6 illustrate operations of a base station and a terminal with respect to a method representing identify information of a warning message scheduled to be transmitted and a last serial number in a paging message in order to transmit/receive a warning message.

FIG. 5 is a flowchart illustrating a warning message broadcast procedure of a base station in a wireless communication system according to another embodiment of the present invention.

Referring to FIG. 5, the base station determines whether a warning message to transmit occurs due to an emergency and disaster circumstance in step 501. When the warning message to transmit occurs, the base station proceeds to step 503 to determine an ID of the warning message to transmit and a last serial number. Here, the warning message includes a message ID, a serial number, and a warning message segment. The base station may generate a plurality of warning messages with respect to the emergency and disaster circumstance. At this point, each of the plurality of warning messages with respect to the same circumstance has the same ID, and is set to a different serial number.

After that, the base station broadcasts a paging message including an ID of the warning message to transmit and the last serial number in step 505. For example, as illustrated in FIG. 13A, the base station may incorporate an ID 1301 of a warning message and a last serial number 1303 of a warning message having a relevant ID into a paging message indicating transmission of an ETWS message and a paging message indicating transmission of a CMAS message and broadcast the same. Here, the base station inserts a last serial number for each ID of a warning message to allow a terminal to determine a reception completion point of a relevant warning message. At this point, to allow the terminal to determine a reception start point and a reception completion point of a relevant warning message, the base station may insert an ID 1311 of a warning message, a last serial number 1313, and a first serial number 1315 into the paging message as illustrated in FIG. 13B. Of course, the paging message should include warning message indication information indicating transmission of a warning message.

After that, the base station transmits a system information block message including relevant warning messages in step 507, and proceeds to step 509 to determine whether a circumstance related to the warning message has ended. When the circumstance related to the warning message has not ended, the base station returns to step 507 to re-perform subsequent steps. In contrast, when the circumstance related to all of the warning messages has ended, the base station ends the algorithm according to the present invention.

FIG. 6 is a flowchart illustrating a warning message receiving procedure of a terminal in a wireless communication system according to another embodiment of the present invention.

Referring to FIG. 6, the terminal determines whether a paging message is received in step 601. When the paging message is received, the terminal determines an ID of a warning message scheduled to be transmitted and a last serial number of each message ID from the received paging message in step 603. Of course, at this point, the terminal may determine the base station transmits a warning message via a system information block message before the base station transmits the next paging message by determining warning message indication information from the received paging message, and accordingly determine the terminal should receive a warning message having the determined ID.

After that, the terminal receives warning messages corresponding to the determined ID via a system information block in step 605. Here, the terminal may receive warning messages corresponding to the determined ID via a relevant system information block by determining scheduling information where the warning message is to be transmitted via a system information block type 1.

After that, the terminal determines whether a warning message having the last serial number is received with respect to a message having the determined ID in step 607. When the warning message having the last serial number is not received, the terminal returns to step 605 to continue to receive a warning message having a relevant ID via a system information block.

In contrast, when the warning message having the last serial number is received, the terminal proceeds to step 609 to determine whether all of messages whose serial number is smaller than the last serial number have been received with respect to messages having the same ID. At this point, when a warning message of the same ID received before the paging message of step 601 is received exists, the terminal may determine whether all of messages from a serial number greater than a serial number of the previously received warning message by 1 to a serial number smaller than the last serial number have been received. For another example, when a first serial number for a relevant ID is included in the paging message, the base station may determine whether all of warning messages from the first serial number to the last serial number have been received.

In the case where all of warning messages from the first serial number to the last serial number have not been received, the terminal returns to step 605 to re-perform subsequent steps. In the case where all of warning messages from the first serial number to the last serial number have been received, the terminal determines reception of a warning message for a relevant ID is completed, and stops an operation for receiving a warning message for the relevant ID, and then proceeds to step 611 to collect and process all of warning messages whose serial numbers are different, having the same ID, thereby providing content of the warning message to a user.

After that, the terminal proceeds to step 613 to determine whether reception has been completed with respect to an ID of all warning messages determined from the paging message received in step 601. When the reception has not been completed with respect to an ID of all warning messages, the terminal returns to step 605 to re-perform subsequent steps. In contrast, when the reception has been completed with respect to an ID of all warning messages, the terminal ends the algorithm according to the present invention.

Figure 7:
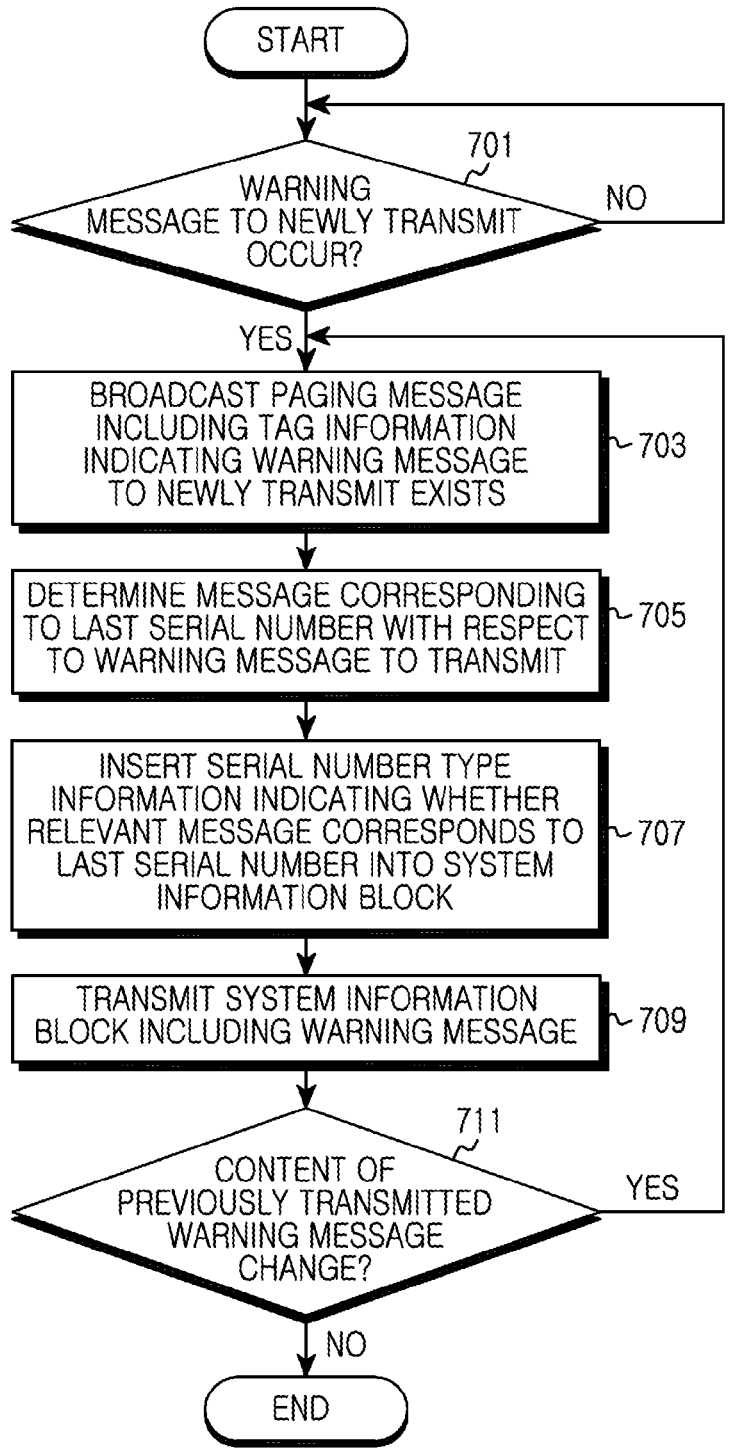
FIG. 7 is a flowchart illustrating a warning message broadcast procedure of a base station in a wireless communication system according to still another embodiment of the present invention.
Figure 8:
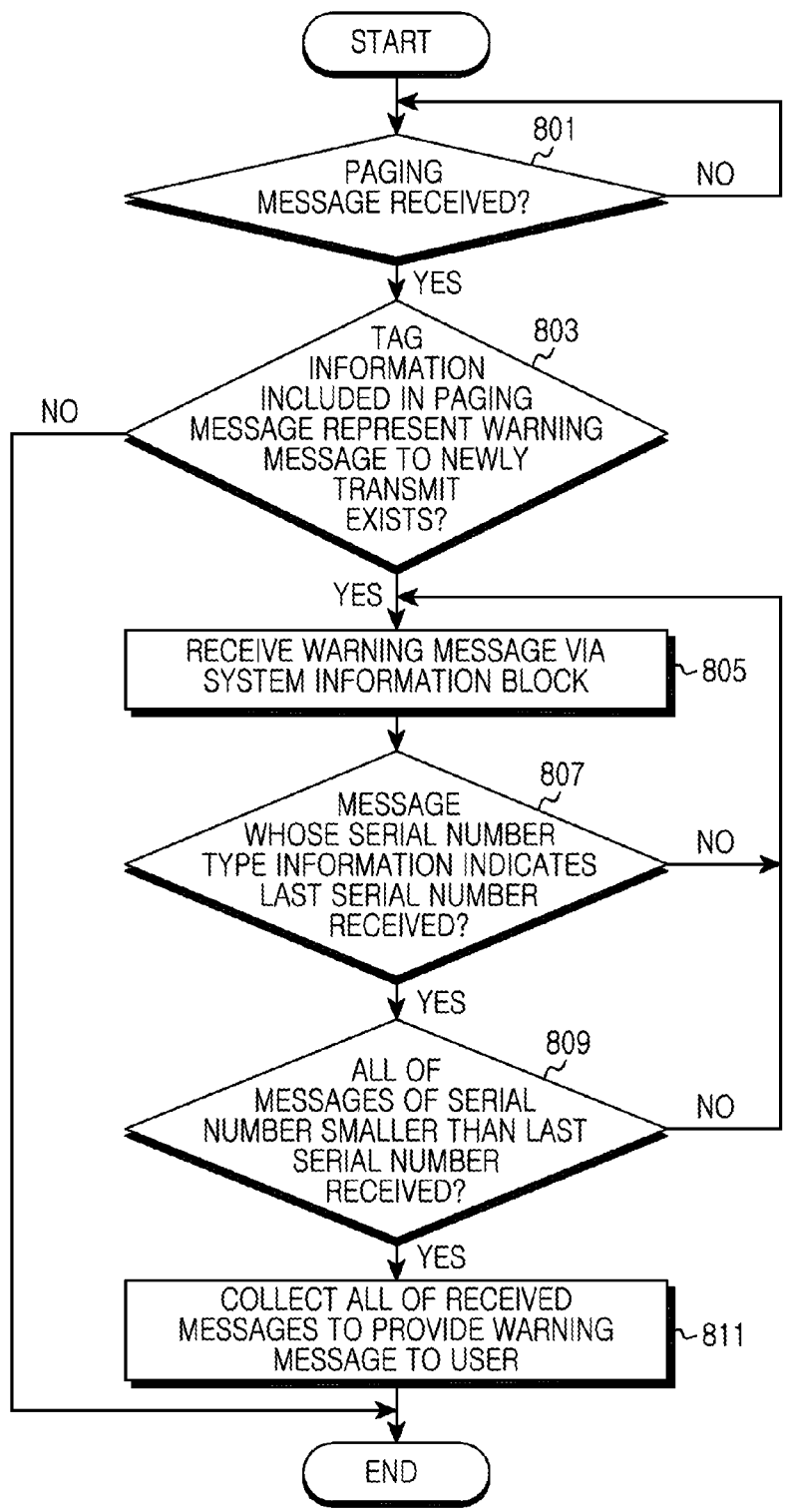
FIG. 8 is a flowchart illustrating a warning message receiving procedure of a terminal in a wireless communication system according to still another embodiment of the present invention.

Next, FIGS. 7 and 8 illustrate operations of a base station and a terminal with respect to a method representing information indicating a warning message is updated in a paging message, and indicating serial number type information in a system information block message in order to transmit/receive a warning message. FIGS. 7 and 8 assume and describe a circumstance where only a warning message having a specific message ID is transmitted within a section of a relevant paging message, that is, until the next paging message is transmitted after a specific paging message is transmitted.

FIG. 7 is a flowchart illustrating a warning message broadcast procedure of a base station in a wireless communication system according to still another embodiment of the present invention.

Referring to FIG. 7, the base station determines whether a warning message to newly transmit occurs due to an emergency and disaster circumstance in step 701. At this point, the terminal determines a warning message to newly transmit has occurred even in the case where an ID or a serial number of a relevant warning message changes due to content change of a previously transmitted warning message and so a changed warning message needs to be transmitted.

When the warning message to newly transmit occurs, the base station broadcasts a paging message including tag information indicating the warning message to newly transmit exists in step 703. For example, as illustrated in FIG. 14, the base station may incorporate tag information 1401 indicating the warning message to newly transmit exists into a paging message indicating transmission of an ETWS message and a paging message indicating transmission of a CMAS message and broadcast the same.

After that, the base station proceeds to step 705 to determine a last serial number of the warning message to newly transmit, and then proceeds to step 707 to insert serial number type information indicating whether a relevant message corresponds to a last serial number into the new warning message included inside a system information block. For example, the base station may set a serial number type of a warning message of a last serial number to "Last" inside a system information block, and set a serial number type of a warning message of the other serial numbers to "Normal". Here, the base station inserts serial number type information into each warning message inside the system information block to allow a terminal to determine a reception completion point of a relevant warning message. At this point, to allow the terminal to determine a reception start point of a relevant warning message, the base station may set the serial number type to "First" to indicate the relevant message is a warning message corresponding to a first serial number.

After that, the base station transmits the system information block message in step 709. After that, the base station determines whether content of a previously transmitted warning message changes in step 711. That is, the base station determines whether an ID or a serial number of the relevant warning message changes due to content change of the previously transmitted warning message, so that whether a changed warning message needs to be transmitted. In the case where content of the warning message changes, the base station returns to step 703 to re-perform subsequent steps. In the case where the content of the warning message does not change, the base station ends the algorithm according to the present invention.

FIG. 8 is a flowchart illustrating a warning message receiving procedure of a terminal in a wireless communication system according to still another embodiment of the present invention.

Referring to FIG. 8, the terminal determines whether a paging message is received in step 801. When the paging message is received, the terminal determines whether the received paging message indicates whether a warning message to be newly transmitted exists in step 803. Here, the terminal may determine whether a warning message to be newly transmitted exists before the next paging message via tag information included in the paging message. When it is determined that a warning message to be newly transmitted does not exist, the terminal ends the algorithm according to the present invention.

In contrast, when it is determined that a warning message to be newly transmitted exists, the terminal proceeds to step 805 to receive warning messages via a system information block. Here, the terminal may receive warning messages via the relevant system information block by determining scheduling information where the warning message is to be transmitted via a system information block type 1.

After that, the terminal determines whether a warning message whose serial number type information indicates a last serial number is received in step 807. That is, the terminal determines whether a warning message whose serial number type information has been set to "Last" inside a system information block is received. When a warning message whose serial number type information is a last serial number is not received, the terminal returns to step 805 to continue to receive a warning message via the system information block.

In contrast, when a warning message whose serial number type information is a last serial number is received, the terminal proceeds to step 809 to determine whether all of messages whose serial number is smaller than the last serial number have been received. At this point, when a warning message having the same ID as the warning message is received before the paging message of step 801 is received, the terminal may determine whether all of warning messages of serial numbers from a serial number greater than a serial number of the previously received warning message by 1 to a serial number smaller than the last serial number have been received. For another example, when a warning message whose serial number type information has been set to "First" is received via a system information block, the base station may determine a serial number of the warning message set to "First" as a first serial number, and determine whether all of warning messages from the first serial number to the last serial number have been received.

In the case where all of messages of a serial number smaller than the last serial number have not been received, the terminal returns to step 805 to re-perform subsequent steps. In the case where all of messages of a serial number smaller than the last serial number have been received, the terminal determines reception of warning messages has been completed, stops a warning message reception operation, and then proceeds to step 811 to collect and process all of warning messages of different serial numbers, having the same ID, thereby providing content of a warning message to a user. After that, the terminal ends the algorithm according to the present invention.

Though FIGS. 7 and 8 add serial number type information to a system information block to indicate whether a relevant warning message is a warning message of a last serial number, in the case where only a warning message having a specific message ID is transmitted inside a relevant paging section as described above, the serial number type information may be omitted.

Also, though FIGS. 7 and 8 assume and describe a case where only a warning message having a specific message ID is transmitted inside a relevant paging section, the method is equally applicable to even a case where a plurality of warning messages having different message IDs are transmitted inside the relevant paging section. However, in the case where a plurality of warning messages having different message IDs are transmitted inside the relevant paging section, the paging message should include message ID information of new warning messages scheduled to be transmitted.

Figure 9:
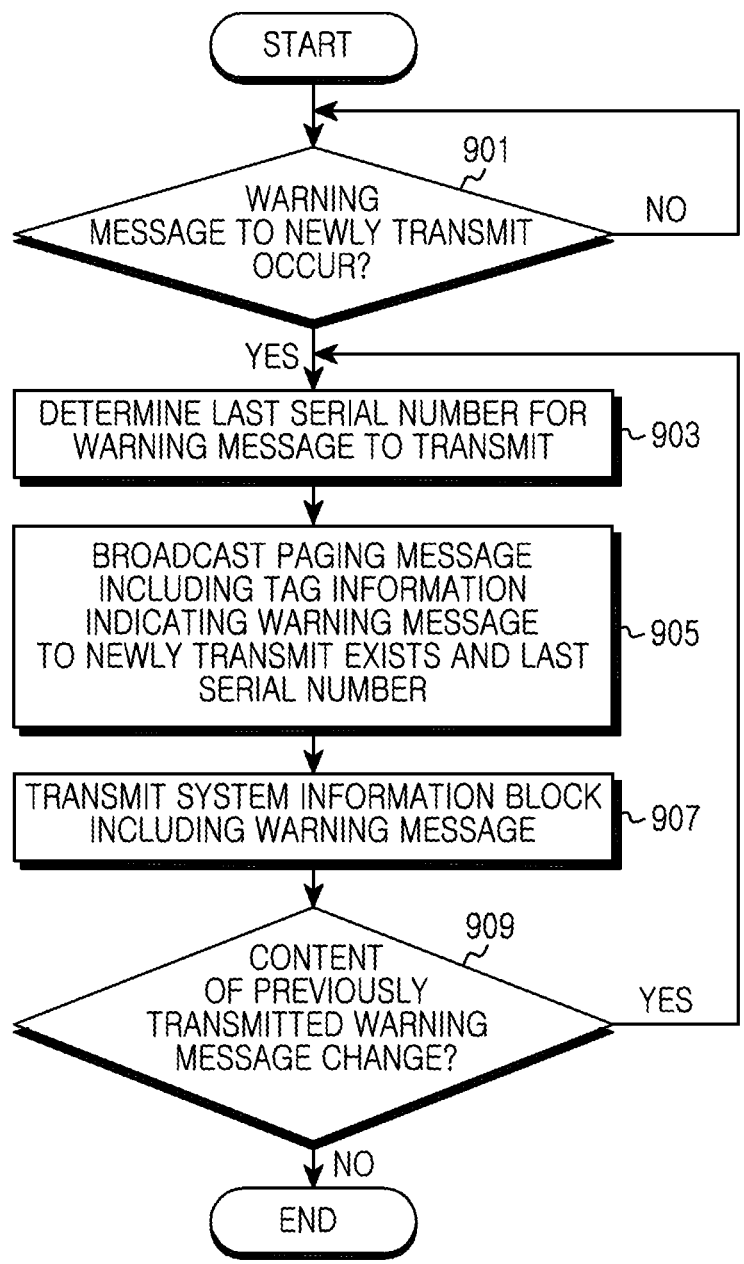
FIG. 9 is a flowchart illustrating a warning message broadcast procedure of a base station in a wireless communication system according to still yet another embodiment of the present invention.
Figure 10:
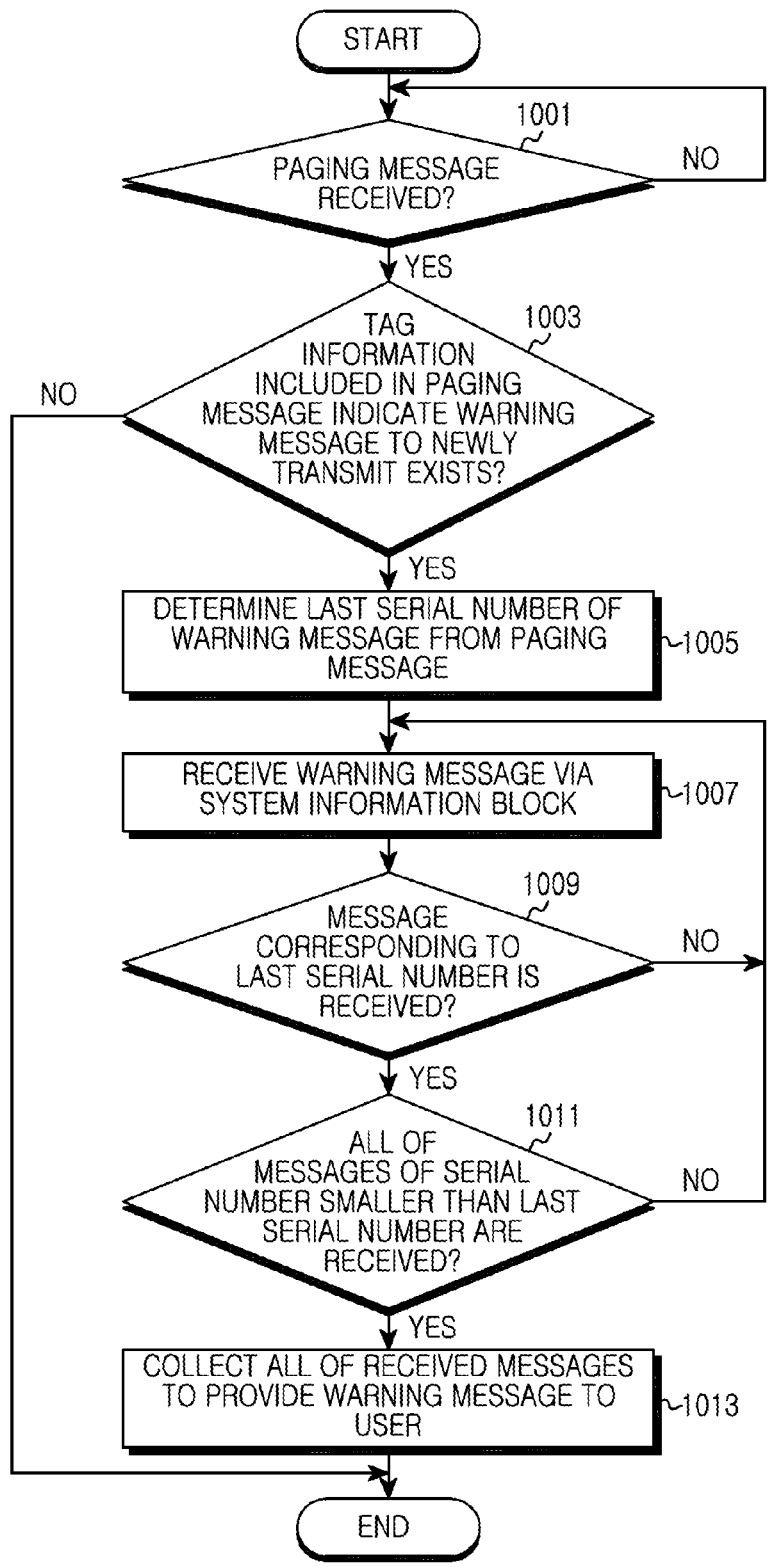
FIG. 10 is a flowchart illustrating a warning message receiving procedure of a terminal in a wireless communication system according to still yet another embodiment of the present invention.

Last, FIGS. 9 and 10 illustrate operations of a base station and a terminal with respect to a method representing information indicating a warning message is updated and a last serial number in a paging message in order to transmit/receive a warning message. FIGS. 9 and 10 assume and describe a case where only a warning message having a specific message ID is transmitted inside a section of a relevant paging message.

FIG. 9 is a flowchart illustrating a warning message broadcast procedure of a base station in a wireless communication system according to still yet another embodiment of the present invention.

Referring to FIG. 9, the base station determines whether a warning message to newly transmit occurs due to an emergency and disaster circumstance in step 901. At this point, the terminal determines a warning message to newly transmit has occurred even in the case where an ID or a serial number of a relevant warning message changes due to content change of a previously transmitted warning message and so a changed warning message needs to be transmitted.

When the warning message to newly transmit occurs, the base station proceeds to step 903 to determine a last serial number of the warning message to newly transmit, and broadcasts a paging message including tag information indicating a warning message to newly transmit exists and the last serial number in step 905. Here, the base station inserts the last serial number to allow a terminal to determine reception completion point of a relevant warning message. At this point, to allow the terminal to determine a reception start point of a relevant warning message, the base station may additionally insert a first serial number into the paging message. Of course, the paging message should include warning message indication information indicating transmission of a warning message.

After that, the base station transmits a system information block message including warning messages in step 907.

After that, the base station determines whether content of a previously transmitted warning message changes in step 909. That is, the base station determines whether an ID or a serial number of a relevant warning message changes due to content change of a previously transmitted warning message and so whether a changed warning message needs to be transmitted. In the case where the content of the warning message changes, the base station returns to step 903 to re-perform subsequent steps. In the case where the content of the warning message does not change, the base station ends the algorithm according to the present invention.

FIG. 10 is a flowchart illustrating a warning message receiving procedure of a terminal in a wireless communication system according to still yet another embodiment of the present invention.

Referring to FIG. 10, the terminal determines whether a paging message is received in step 1001. When the paging message is received, the terminal determines whether the received paging message indicates a warning message to be newly transmitted exists in step 1003. Here, the terminal may determine whether a warning message to be newly transmitted exists before the next paging message via tag information included in the paging message. When it is determined that the warning message to be newly transmitted does not exist, the terminal ends the algorithm according to the present invention.

In contrast, when it is determined that a warning message to be newly transmitted exists, the terminal determines a last serial number from the paging message in step 1005, and proceeds to step 1007 to receive warning messages via a system information block. Here, the terminal may receive warning messages via a relevant system information block by determining scheduling information where the warning message is to be transmitted via a system information block type 1.

After that, the terminal determines whether a warning message having a last serial number is received in step 1009. When the warning message having the last serial number is not received, the terminal returns to step 1007 to continue to receive a warning message via a system information block.

In contrast, when the warning message having the last serial number is received, the terminal proceeds to step 1011 to determine whether all of messages whose serial number is smaller than the last serial number have been received. At this point, when a warning message of the same ID received before the paging message of step 1001 is received exists, the terminal may determine whether all of warning messages of serial numbers from a serial number greater than a serial number of the previously received warning message by 1 to a serial number smaller than the last serial number have been received. For another example, when a first serial number is included in the paging message, the base station may determine whether all of warning messages from the first serial number to the last serial number have been received.

In the case where all of messages of a serial number smaller than the last serial number have not been received, the terminal returns to step 1007 to re-perform subsequent steps. In the case where all of messages of a serial number smaller than the last serial number have been received, the terminal determines reception of a warning message has been completed, stops a warning message reception operation, and proceeds to step 1013 to collect and process all warning messages of different serial numbers, having the same ID, thereby providing content of a warning message to a user. After that, the terminal ends the algorithm according to the present invention.

Though FIGS. 9 and 10 represent a last serial number in the paging message, in the case where only a warning message having a specific message ID is transmitted inside a relevant paging section as described above, the paging message may not include the last serial number.

Also, FIGS. 9 and 10 assume and describe a case where only a warning message having a specific message ID is transmitted inside a relevant paging section, the method is equally applicable to even a case where a plurality of warning messages having different message IDs are transmitted inside the relevant paging section. However, in the case where a plurality of warning messages having different message IDs are transmitted inside the relevant paging section, the paging message should include message ID information of new warning messages scheduled to be transmitted and a last serial number for each message ID.

Though the present invention has described transmitting/receiving a warning message using one of four methods illustrated in FIGS. 3 to 10, a method of transmitting/receiving the warning message may change variously within a scope not departing from the spirit of the present invention. For example, at least two or more of the above four methods may be mixed and used. Also, though information required for reception of a warning message has been provided to a terminal using a paging message and a system information block message simultaneously or using only a paging message according to the present invention, information required for reception of the warning message may be provided to the terminal using only a system information block message depending on a design scheme. For example, only warning message indication information indicating a warning message is transmitted is set to the paging message, and serial number type information for a relevant warning message may be indicated via a system information block message.

Meanwhile, operations according to embodiments of the present invention may be implemented by a single controller. In this case, a program instruction for performing an operation implemented using various computers may be recorded on a computer-readable medium. The computer-readable medium may include a program instruction, a data file, a data structure, etc. independently or a combination thereof. The program instruction may be things specially designed and configured for the present invention, or known to and availably by a person of ordinary skill in the art. Examples of the computer-readable recording medium include a hard disk, a magnetic medium such as a floppy disk and a magnet tape, an optical recording medium such as a CD-ROM or a DVD, a magnetic-optical medium such as a floptical disk, and a hardware device specially configured for storing and performing a program instruction such as ROM, RAM, a flash memory, etc. Examples of a program instruction include not only a machine language code such as things generated by a complier but also a high-language code executable by a computer using an interpreter, etc.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A method for operating a base station in a wireless communication system, the method comprising:
   broadcasting a paging message comprising information regarding a warning message scheduled to be transmitted, the information regarding the warning message being used for determining completion of receiving all of segments of the warning message; and
   broadcasting a system information block message comprising one of the segments of the warning message after the broadcasting of the paging message.

2. The method of claim 1, wherein the information regarding the warning message comprises at least one an identifier of the warning message, a first serial number of the segments of the warning message, a last serial number of the segments of the warning message, or an indicator that indicates whether the warning message is updated.

3. The method of claim 1, wherein the system information block message further comprises at least one of an identifier of the warning message, a serial number of one of the segments, or a type of the serial number.

4. The method of claim 3, wherein the type of the serial number indicates a first segment, a last segment, or a normal segment.

5. A method for operating a terminal in a wireless communication system, the method comprising:
   receiving a paging message comprising information regarding a warning message scheduled to be transmitted, the information regarding the warning message being used for determining completion of receiving all of segments of the warning message; and
   receiving a system information block message comprising one of the segments of the warning message, after the receiving of the paging message.

6. The method of claim 5, wherein the information regarding the warning message comprises at least one of an identifier of the warning message, a first serial number of the segments of the warning message, a last serial number of the segments of the warning message, or an indicator that indicates whether the warning message is updated.

7. The method of claim 5, further comprising:
   receiving another paging message comprising an indicator that indicates that the warning message is not updated; and
   omitting the receiving of at least one system information block message until the next paging message is received.

8. The method of claim 5, wherein the system information block message further comprises at least one of an identifier of the warning message, a serial number of one of the segments, or a type of the serial number.

9. The method of claim 5, further comprising:
   receiving a segment of the warning message corresponding to a last serial number;
   determining whether all of the segments of the warning message corresponding to serial numbers smaller than the last serial number are received; and
   if all of the segments of the warning messages are received, determining reception completion of the warning message.

10. The method of claim 8, wherein the type of the serial number indicates a first segment, a last segment, or a normal segment.

11. An apparatus for operating a base station in a wireless communication system, the apparatus comprising:
    a memory configured to store instructions therein;
    a transmitter configured to:
      broadcast a paging message comprising information regarding a warning message scheduled to be transmitted, the information regarding the warning message being used for determining completion of receiving all of segments of the warning message; and
    at least one processor configured, upon execution of the instructions, to:
      broadcast a system information block message comprising one of the segments of the warning message, after the broadcasting of the paging message.

12. The apparatus of claim 11, wherein the information regarding the warning message comprises at least one of an identifier of the warning message, a first serial number of the segments of the warning message, a last serial number of the segments of the warning message, or an indicator that indicates whether the warning message is updated.

13. The apparatus of claim 11, wherein the system information block message further comprises at least one of an identifier of the warning message identity information, a serial number of the one of the segments, or a type of the serial number.

14. The apparatus of claim 13, wherein the type of the serial number indicates a first segment, a last segment, or a normal segment.

15. An apparatus for operating a terminal in a wireless communication system, the apparatus comprising:
    a memory configured to store instructions therein;
    a receiver configured to:
      receive a paging message comprising information regarding a warning message scheduled to be transmitted, the information regarding the warning message being used for determining completion of receiving all of segments of the warning message; and
    at least one processor configured, upon execution of the instructions, to:
      receive a system information block message comprising one of the segments of the warning message, after the receiving of the paging message.

16. The apparatus of claim 15, wherein the information regarding the warning message comprises at least one of an identifier of the warning message, a first serial number of the segments of the warning message, a last serial number of the segments of warning message, or an indicator that indicates whether the warning message is updated.

17. The apparatus of claim 15, wherein the at least one processor is further configured to omit the receiving of at least one system information block message until a next paging message is received, if receiving another paging message comprising an indicator indicates that the warning message is not updated.

18. The apparatus of claim 15, wherein the system information block message further comprises at least one of an identifier of the warning message, a serial number of the one of the segments, or a type of the serial number.

19. The apparatus of claim 15, wherein the at least one processor is further configured to:
  determine whether all of the segments of the warning message corresponding to serial numbers smaller than a last serial number are received, if receiving a segment of the warning message corresponding to the last serial number; and
  determine reception completion of the warning message, if all of the segments of the warning message are received.

20. The apparatus of claim 18, wherein the type of the serial number indicates a first segment, a last segment, or a normal segment.

* * * * *